US012550968B2

(12) United States Patent
Tseng

(10) Patent No.: US 12,550,968 B2
(45) Date of Patent: Feb. 17, 2026

(54) SHOE WITH ENHANCED WIRELESS SIGNAL TRANSMISSION

(71) Applicant: POU CHEN CORPORATION, Chang Hwa Hsien (TW)

(72) Inventor: Liang-Chia Tseng, Chang Hwa Hsien (TW)

(73) Assignee: Pou Chen Corporation, Chang Hwa Hsien (TW)

( * ) Notice: Subject to any disclaimer, the term of this patent is extended or adjusted under 35 U.S.C. 154(b) by 0 days.

(21) Appl. No.: 18/760,503

(22) Filed: Jul. 1, 2024

(65) Prior Publication Data

US 2025/0009066 A1 Jan. 9, 2025

(30) Foreign Application Priority Data

Jul. 7, 2023 (TW) ................................ 112125476

(51) Int. Cl.
*A43B 3/48* (2022.01)
*H04B 1/3827* (2015.01)
*H01Q 1/27* (2006.01)

(52) U.S. Cl.
CPC ............... *A43B 3/48* (2022.01); *H04B 1/385* (2013.01); *H01Q 1/273* (2013.01)

(58) Field of Classification Search
CPC ................................... A43B 3/38; A43B 3/40
USPC .......................................................... 36/114
See application file for complete search history.

(56) References Cited

U.S. PATENT DOCUMENTS

2006/0041448 A1* 2/2006 Patterson ............. G06Q 10/101 705/300
2009/0137933 A1* 5/2009 Lieberman ............ A61B 5/1117 600/595
2013/0019694 A1* 1/2013 Molyneux ............ A43B 3/0031 73/862.381

FOREIGN PATENT DOCUMENTS

TW 201729704 A 9/2017
TW 202236992 A 10/2022

OTHER PUBLICATIONS

Search Report appended to an Office Action, which was issued to Taiwanese counterpart application No. 112125476 by the TIPO on Apr. 1, 2024, with an English translation thereof.

* cited by examiner

*Primary Examiner* — Timothy K Trieu
(74) *Attorney, Agent, or Firm* — Rosenberg, Klein & Lee

(57) ABSTRACT

A shoe with enhanced wireless signal transmission includes a shoe body, a wireless circuit module, and a metal conductive component. The shoe body includes an upper, a midsole that is disposed below the upper, and an outsole that is disposed below the midsole. The wireless circuit module is disposed on the midsole and includes a transmission segment that is configured to transmit a wireless signal, and a grounding segment that is configured to provide grounding for the transmission segment. The metal conductive component is disposed on the shoe body and is electrically connected to the grounding segment, wherein a length of the metal conductive component ranges from 20 mm to 100 mm, and a width of the metal conducting component ranges from 20 mm to 110 mm.

6 Claims, 4 Drawing Sheets

SHOE WITH ENHANCED WIRELESS SIGNAL TRANSMISSION

CROSS-REFERENCE TO RELATED APPLICATION

This application claims priority to Taiwanese Invention Patent Application No. 112125476, filed on Jul. 7, 2023, the entire disclosure of which is incorporated by reference herein.

FIELD

The disclosure relates to a shoe, and more particularly to a shoe with enhanced wireless signal transmission.

BACKGROUND

A conventional smart shoe includes a shoe body and a chip that is embedded in the shoe body. The chip is configured to detect parameters related to the conventional smart shoe including step count, pressure, etc., and to send the parameters to a mobile device (e.g., mobile phone) of the user through wireless signal transmission for record.

However, when the user steps on the ground, a force of the user stepping and a counter force from the ground cooperatively exert pressure on the shoe body, causing the shoe body to deform. The deformation of the shoe body may affect the wireless signal transmission by creating noise in the wireless signal, interrupting signal transmission, or reducing signal transmission speed.

SUMMARY

Therefore, an object of the disclosure is to provide a shoe with enhanced wireless signal transmission that can alleviate at least one of the drawbacks of the prior art.

According to the disclosure, a shoe with enhanced wireless signal transmission includes a shoe body, a wireless circuit module, and a metal conductive component. The shoe body includes an upper, a midsole that is disposed below the upper, and an outsole that is disposed below the midsole. The wireless circuit module is disposed on the midsole and includes a transmission segment that is configured to transmit a wireless signal, and a grounding segment that is configured to provide grounding for the transmission segment. The metal conductive component is disposed on the shoe body and is electrically connected to the grounding segment, wherein a length of the metal conductive component ranges from 20 mm to 100 mm, and a width of the metal conducting component ranges from 20 mm to 110 mm.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
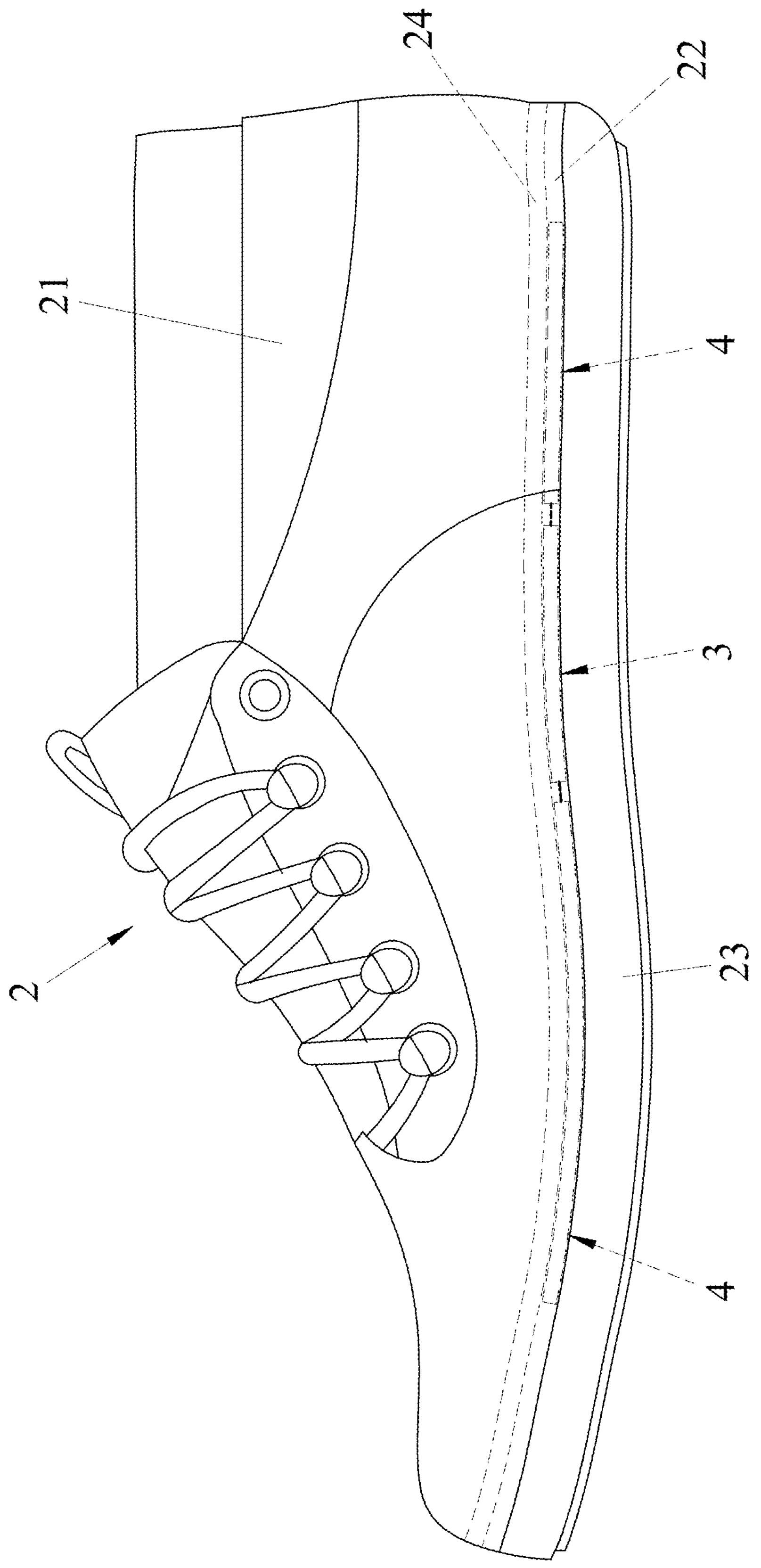
FIG. 1 is a side view of a shoe with enhanced wireless signal transmission according to a first embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
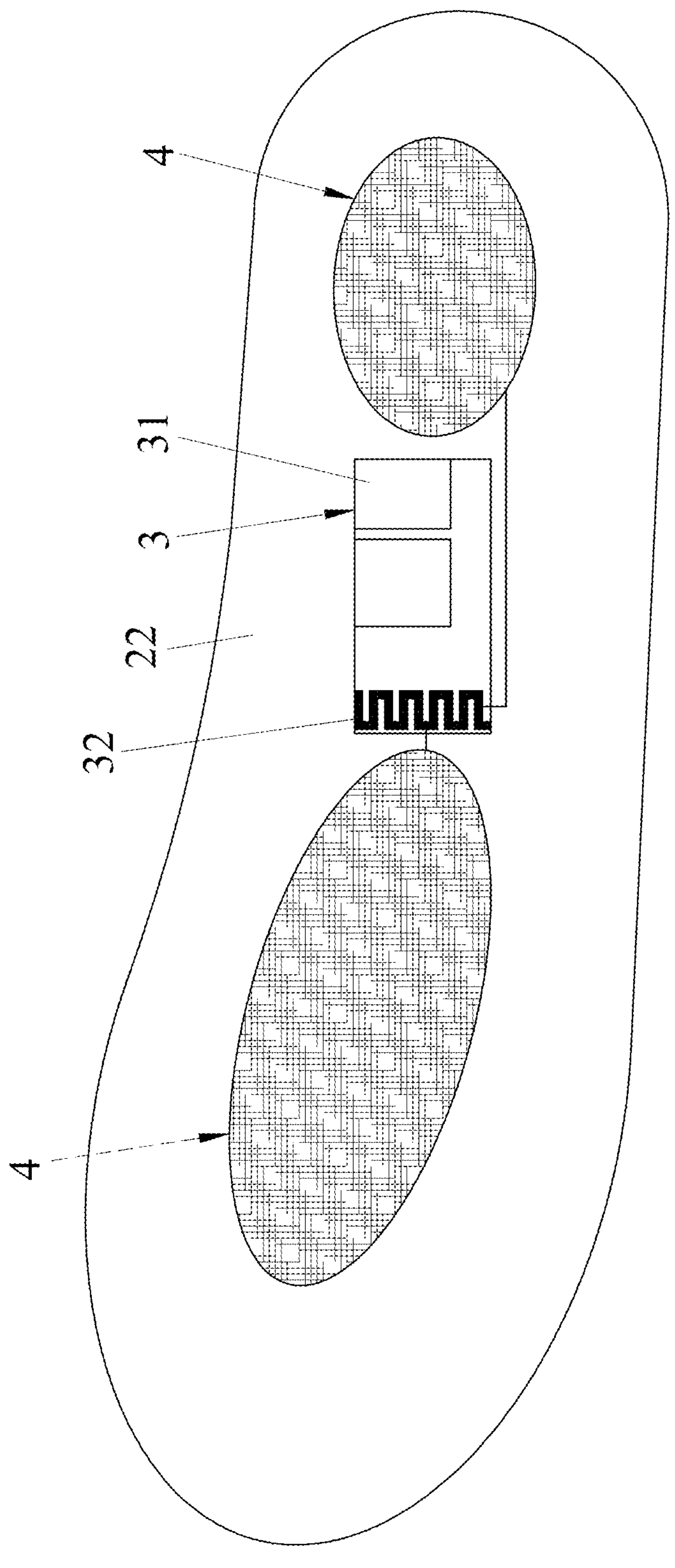
FIG. 2 is a top view of the shoe illustrating a midsole, a wireless circuit module, and two metal conductive components of the first embodiment.

Referring to FIGS. 1 and 2, according to a first embodiment of the disclosure, a shoe with enhanced wireless signal transmission includes a shoe body 2, a wireless circuit module 3, and two metal conductive components 4.

The shoe body 2 includes an upper 21, a midsole 22 that is disposed below and mounted to a bottom of the upper 21, an outsole 23 that is disposed below and mounted to a bottom of the midsole 22, and an insole 24 that is disposed above the midsole 22.

The wireless circuit module 3 is disposed on and mounted to the midsole 22, and includes a transmission segment 31 that is configured to transmit a wireless signal, and a grounding segment 32 that is configured to provide grounding for the transmission segment 31. In this embodiment, the wireless circuit module 3 is embedded in the midsole 22, and is configured to detect parameters including step count of a user that is wearing the shoe, pressure exerted on the shoe, etc., and to send the parameters through wireless signal transmission to an electrical device of the user, where the electrical device has wireless signal transmission and reception capability (e.g., a mobile phone, a smart watch, a heart rate monitor, a pair of Bluetooth glasses). By placing the wireless circuit module 3 in the midsole 22, the user would not directly contact the wireless circuit module 3, thereby increasing comfort when wearing the shoe.

The metal conductive components 4 are mounted to the shoe body 2 and are electrically connected to the grounding segment 32. To describe in further detail, the metal conductive components 4 are embedded in the midsole 22 respectively on two sides of the wireless circuit module 3 along a front-rear direction of the shoe body 2. In one example, the wireless circuit module 3 and the two metal conductive components 4 may be embedded in the midsole 22 or in the insole 24, and may be placed at a first position that corresponds to an arch, at a second position that corresponds to a forefoot, and at a third position that corresponds to a heel, respectively.

A length of each of the metal conductive components 4 is defined along the front-rear direction and ranges from 20 mm to 100 mm. A width of each of the metal conductive components 4 is defined along a left-right direction of the shoe body 2 (perpendicular to the front-rear direction) and ranges from 20 mm to 110 mm. A thickness of each of the metal conductive components 4 ranges from 0.05 mm to 1 mm. In one example, a ratio of the length of one of the metal conductive components 4 that is placed at a front side of the shoe body 2 (e.g., the second position) to the length of another one of the metal conductive components 4 that is placed at a rear side of the shoe body 2 (e.g., the third position) ranges from one to two. In this embodiment, the metal conductive components 4 are ductile, are made of silver, copper, or tin, and are electrically connected to the grounding segment 32 through welding, mechanical fastening, or wire connection.

In this embodiment, the metal conductive components 4 are made by 3D printing. In some embodiments, the midsole 22 is entirely made by 3D printing, where the metal conductive components 4 mounted to the midsole 22 are printed using metals.

Since the metal conductive components 4 are electrically connected to the grounding segment 32, the metal conductive components 4 and the grounding segment 32 cooperatively form a large grounding area, which may suppress noise in the wireless signal. Furthermore, placing the metal conductive components 4 (with the ratio between their lengths ranging from one to two) on two sides of the wireless circuit module 3 may increase reflection path for wireless signal transmission by the wireless circuit module 3, thereby enhancing wireless signal transmission in terms of signal strength. As such, this configuration may induce a higher signal-to-noise ratio, thereby enhancing wireless transmission stability.

Figure 3:
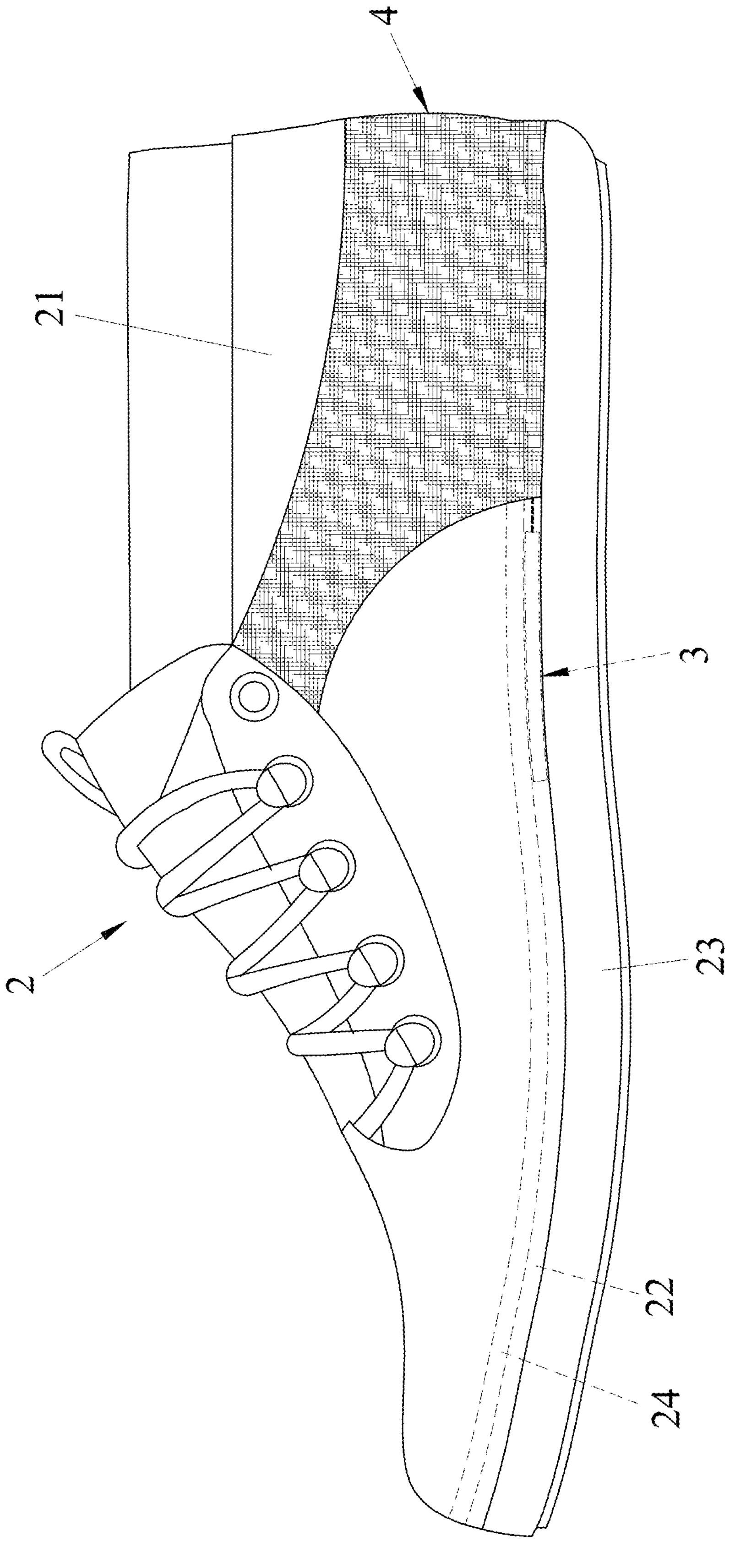
FIG. 3 is a side view of the shoe with enhanced wireless signal transmission according to a second embodiment of the disclosure.

Referring to FIG. 3, a second embodiment is similar to the first embodiment, but their difference resides in that the shoe of the second embodiment includes only one metal conductive component 4, and that metal conductive component 4 is formed in a mesh pattern and is disposed on the upper 21. As such, the second embodiment achieves the same function as the first embodiment, and the mesh structure of the metal conductive component 4 can provide better breathability and elasticity for the shoe. Moreover, disposing the meshed metal conductive component 4 on the upper 21 prevents the metal conductive component 4 from being damaged by stepping of the user when the user is walking, thereby prolonging a service life of the metal conductive component 4.

Figure 4:
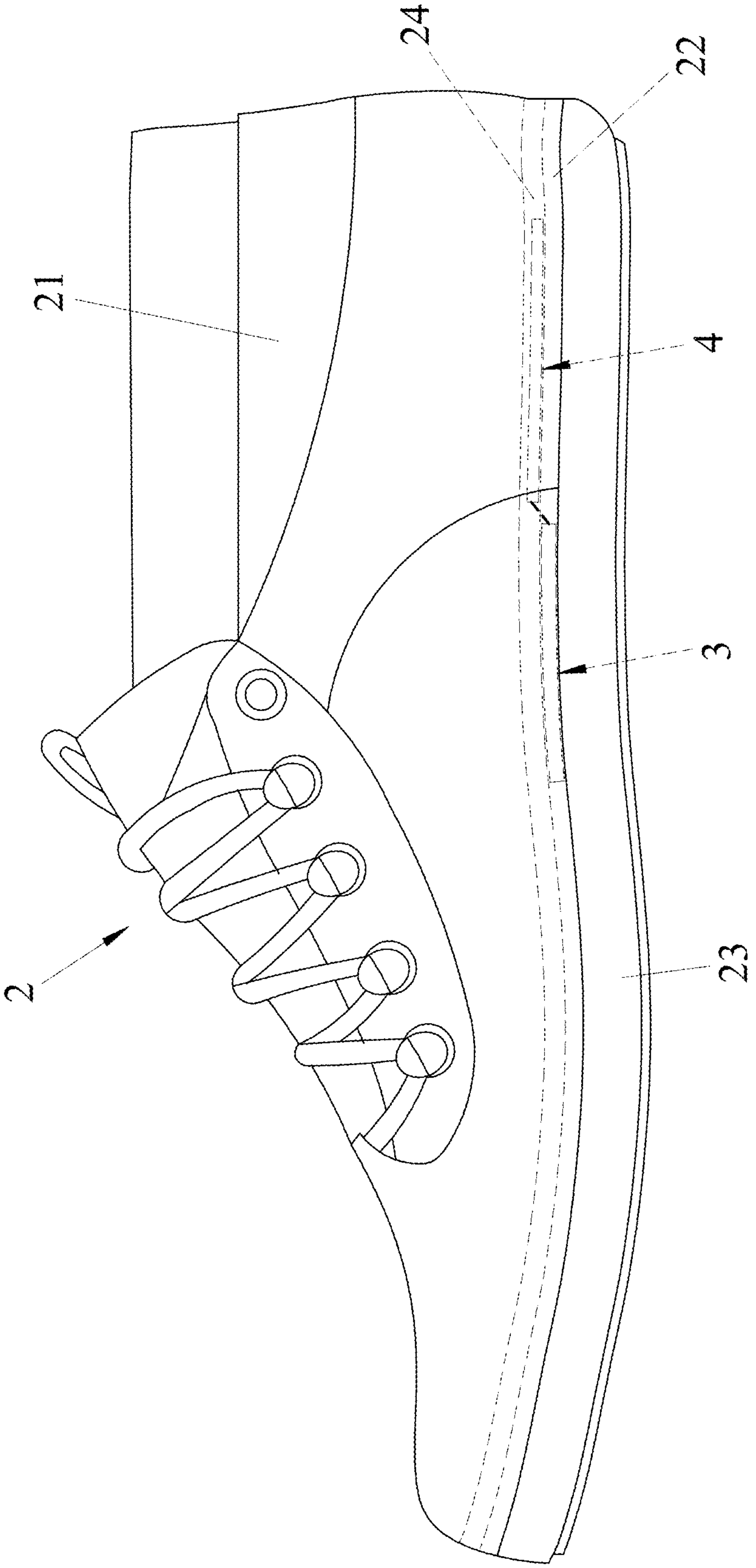
FIG. 4 is a side view of the shoe with enhanced wireless signal transmission according to a third embodiment of the disclosure.

Referring to FIG. 4, a third embodiment is similar to the first embodiment, but their difference resides in that the shoe of the third embodiment includes only one metal conductive component 4, and that metal conductive component 4 is mounted to (e.g., embedded in) a bottom of the insole 24. As such, the third embodiment achieves the same function as the first embodiment.

In summary, according to the disclosure, the metal conductive component(s) 4 is(are) disposed in the shoe body 2 and is(are) electrically connected to the grounding segment 32, thereby forming a large grounding area for suppressing noise in the wireless signal and enhancing wireless signal transmission in both signal strength and transmission stability.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A shoe with enhanced wireless signal transmission, comprising:

a longitudinally-extending shoe body being formed with an upper, a midsole disposed below said upper, and an outsole disposed below said midsole;

a wireless circuit module disposed in said midsole and extending between two longitudinally-opposed end sections, said wireless circuit module including a transmission segment configured to transmit wireless signals and a grounding segment configured to provide electrical grounding for said transmission segment; and two metal conductive components disposed in said shoe body and electrically connected to said grounding segment, wherein each of said two metal conductive components is mounted in said shoe body to be physically spaced from a corresponding one of said two longitudinally-opposed end sections of said wireless circuit module for extending along a heel-toe length direction of said shoe body, thereby said wireless circuit module being disposed between said two metal conductive components and a first one of said two metal conductive components being positioned proximal to a toe portion of said shoe body and a second one of said two metal conductive components being positioned proximal to a heel portion of said shoe body, wherein a ratio of a length of the first one of said two metal conductive components relative to a length of the second one of said two metal conductive components ranges from one to two, and wherein a length of each of said two metal conductive components ranges from 20 mm to 100 mm and a width of each of said two metal conducting conductive components ranges from 20 mm to 110 mm.

2. The shoe as claimed in claim 1, wherein each of said two metal conductive components is mounted in said midsole.

3. The shoe as claimed in claim 2, wherein each of said two metal conductive components is manufactured by 3D printing.

4. The shoe as claimed in claim 3, wherein each of said two metal conductive components is ductile.

5. The shoe as claimed in claim 4, wherein a thickness of each of said two metal conductive components ranges from 0.05 mm to 1 mm.

6. The shoe as claimed in claim 1, wherein said shoe body is further formed with an insole disposed above said midsole and below said upper.

* * * * *